United States Patent

[11] 3,634,144

[72] Inventor Barry Douglas Hanawalt
 Aston Township, Delaware County, Pa.
[21] Appl. No. 54,868
[22] Filed July 14, 1970
[45] Patented Jan. 11, 1972
[73] Assignee Foote Mineral Company
 Exton, Pa.

[54] PROCESS FOR PREPARING LITHIUM-FILLED FORAMINOUS METAL BODIES
11 Claims, No Drawings

[52] U.S. Cl. .................................................. 148/6.3,
 117/51, 117/114, 136/83
[51] Int. Cl. ........................................................ C23c 1/10
[50] Field of Search ........................................... 136/83, 86;
 117/225, 50, 51, 114, 131; 29/182.1; 148/6.3, 6;
 252/474, 476

[56] References Cited

UNITED STATES PATENTS

| | | | |
|---|---|---|---|
| 2,716,670 | 8/1955 | Bacon .......................... | 136/86 D |
| 2,997,517 | 8/1961 | Ciarlariello .................. | 136/86 A |
| 3,226,347 | 12/1965 | Oswin .......................... | 252/474 |
| 3,551,184 | 12/1970 | Dremann et al. ............. | 117/225 X |

Primary Examiner—Ralph S. Kendall
Attorney—Howson & Howson

ABSTRACT: A foraminous metal substrate is oxidized to form a surface film of metal oxide throughout the foraminous areas of the metal and immersed in a molten lithium bath to fill the foraminous substrate with lithium.

PROCESS FOR PREPARING LITHIUM-FILLED FORAMINOUS METAL BODIES

BACKGROUND OF THE INVENTION

1. Field of Invention

This invention relates to a process for preparing lithium-filled foraminous metal substrates, particularly suitable for use as lithium battery anodes.

2. Prior Art

U.S. Pat. application Ser. No. 621,921, filed by Dremann and Hitchings on Mar. 9, 1967, now U.S. Pat. No. 3,551,184, describes a method for bonding lithium metal to other metals in which solid lithium metal is rubbed (scrubbed) across the surface of a solid metal body having a film of oxide thereon and heated to a temperature above the melting point of lithium metal. The heated metal body causes the lithium metal to melt, coating the metal body with molten lithium. Thereafter, the coated metal body is cooled below the melting point of lithium to solidify the lithium coated on the metal body. In this process a reaction occurs between the molten lithium and the surface oxide film on the metal body; however, the reaction occurs only in those areas of contact between the metal body and the solid lithium metal which is rubbed across it. Thus, only surface bonding of lithium metal to the solid metal body occurs in this process.

In the filling of a foraminous metal substrate with lithium metal, desirable in the manufacture of lithium battery anodes, for example, a problem is encountered because of the poor wettability of the substrate metal surfaces with molten lithium. One previous attempt has involved adding lithium to a molten salt bath and immersing the foraminous metal substrate in the bath. However, this resulted in surface contamination by the used salt and possessed other disadvantages and limitations including high temperatures required for melting the salt; selection of a salt with a reasonable melting temperature that does not react with lithium yet is compatible with the battery; poisoning effects of the fused salt bath, and slow production rates.

U.S. Pat. Nos. 3,226,261, and 3,226,341, describe processes for lithiating metal bodies by immersing the metal body into molten lithium which results in diffusion of atomic lithium into the lattice of the metal body, followed by a further treatment which generally involves heating the metal body at a temperature above 500° C. but below the melting point of the metal for a substantial period of time, after which the lithium is found to be incorporated into the metal body in such a manner that upon immersion in water, no reaction between lithium and water is observed. These patents also disclose that immersion of a metal body, such as a nickel sheet, for 35 minutes in molten lithium at a temperature of about 450° C. results in a lithiated nickel sheet which, when immersed in water, produces no reaction between lithium and water. These processes are undesirable because of the high temperatures required and the time required for the lithiating reaction.

U.S. Pat. No. 3,226,264, describes a process for preparing lithiated nickel oxide electrodes in which nickel powder is compacted, sintered, and lithiated in a manner so that nickel oxide remains in the electrode, such as by soaking in solutions of lithium hydroxide or lithium nitrate followed by oxidizing. Another process for lithiating metal bodies is described in U.S. Pat. No. 3,271,196, in which sintered metal bodies are irradiated and then immersed in molten lithium permitting atomic lithium to diffuse into the lattice of the irradiated metal.

U.S. Pat. No. 3,409,465, describes a process for wetting a perforated metal body with molten alkali metal in which the perforated metal body is first plated with cadmium or gold and then wetted with the molten alkali metal.

U.S. Pat. No. 3,211,572 describes a process for impregnating porous metal surfaces with a refractory metal in which the porous metal is first immersed in a molten bath of a metal, such as lithium, to impregnate the porous metal with the lithium followed by contacting the impregnated porous metal with a refractory metal halide vapor causing a reaction which deposits the refractory metal in place of the lithium. The depth of penetration of the lithium is said to be dependent, among other things, upon the head pressure of the molten lithium and any external gas pressure.

It is the principal object of this invention to provide a process for preparing lithium-filled foraminous metal substrates.

It is another object of this invention to provide a foraminous metal substrate treated so as to permit rapid and complete filling thereof with molten lithium.

It is a further object of this invention to provide lithium-filled foraminous metal substrates by a process which is rapid, efficient and economical.

SUMMARY OF THE INVENTION

According to this invention, a lithium-filled foraminous metal substrate is prepared in a process which comprises oxidizing a foraminous metal substrate to form a surface film of metal oxide on substantially all open internal and external surface areas thereof and immersing the oxidized foraminous metal substrate in a molten lithium bath whereby the molten lithium reacts with the oxide film, wetting the metal substrate and penetrating and filling the open internal and external surface areas of the foraminous substrate.

DETAILED DESCRIPTION OF INVENTION

Various foraminous metal substrates can be filled with lithium according to this process including nickel, iron and copper metal substrates. Nickel-, iron- and copper-based alloys, that is, alloys in which nickel, iron or copper are the principal ingredients such as, for example, low-carbon steel (0.09 to 0.2 percent carbon content), stainless steel, monel metal and brass may also be filled with lithium according to this invention. These, and other metals, which melt above and are substantially inert to lithium under the conditions of the lithium-filling operation, can be used in various foraminous states as substrates for the lithium filling.

Useful foraminous states include expanded metal bodies in which metal sheets are slit and then stretched to open the slits. Metal felts, which are mats or sheets of nonwoven metal fibers, are useful, as are metal screens made from wires or by punching or etching holes in a metal sheet. The finest metal substrate materials contemplated for use in this process are porous compacts of sintered metal powders having an average pore size of at least 2 microns and ranging up to 100 microns. The foraminous metal substrates utilized in this process can have openings as large as up to one-fourth inches in their largest dimension; although more typically, the largest openings which are usually filled with lithium are found in expanded metal sheets having openings up to one-eighth or one-sixteenth inches in their largest dimension. As a general rule, the thicker the metal substrate, the bigger the opening which can be filled. The other types of foraminous metal substrates mentioned above have openings ranging in size between those found in expanded metal sheets and the openings found in the porous sintered metal powder compacts. The foraminous metal substrates can be utilized in any shape, that is, as sheets, rods, bars, etc. The sheets may be flat or curved.

The phrase "open internal and external surface areas," as used herein, is meant to define metal substrates, generally porous in nature, having not only exposed open surface areas, but also, internal open surface areas and voids connected with the outer surface areas.

Prior to filling the foraminous metal substrate with molten lithium, the substrate is treated to provide a film of oxide of the metal substrate substantially throughout the surfaces of the open internal and external surface areas thereof. The surface film of metal oxide is obtained by heating the metal substrate in oxygen or air, preferably air, at a temperature sufficient to oxidize the surfaces of the metal substrate.

Generally, the metal substrate is heated in air to a temperature of at least about 300° C. and up to as high as 1,500° C., a convenient determinent being heating the metal substrate to red heat, to form the desired metal oxide film on the surface of the open internal and external surface areas of the metal substrate. The temperature of the oxidation treatment will vary depending on the particular substrate metal the foraminous form of the metal, the gas used in the heating process, and the time required for oxidation of the metal substrate surfaces to occur. Generally, it can be stated that the temperature and time of the oxidation treatment go hand in hand; that is, the higher the temperature, the quicker oxidation of the metal substrate can be accomplished.

Foraminous metal substrates of nickel, iron and nickel and iron-based alloys can be oxidized in air at temperatures ranging from about 350° C. to about 1,350° C. for a period of time ranging from about 60 minutes to a few seconds, respectively, to provide the desired oxide film on the metal. More particularly, sintered porous nickel and iron substrates can be oxidized to provide the desired oxide film at temperatures ranging from about 350° C. to about 1,350° C. for times of about 30 minutes to about 3 seconds, respectively. Varying times and temperatures within these ranges would be equally satisfactory. Expanded nickel and low-carbon steel substrates are most efficiently oxidized in air at temperatures ranging from about 550° C. to about 1,350° C. for times of about 60 minutes to about 3 seconds, respectively. At temperatures below about 550° C. oxidation occurs, but only over long periods of time. Expanded and screen stainless steel are most efficiently oxidized in air at temperatures ranging from about 600° C. to about 1,350° C. for about 40 minutes to about 5 seconds, respectively. The preferred metal substrate is low-carbon steel (containing 0.09 to 0.02 percent of carbon) oxidized at temperatures ranging from about 600° C. to about 1,000° C. for about 40 minutes to a few seconds, respectively.

Copper or copper-based alloys in expanded metal or screen form may be oxidized in air within the temperature and time ranges set forth above; however, the preferred range for oxidizing these copper substrates is somewhat more limited. Thus, the preferred range for oxidizing expanded or screen copper substrates in air is from about 400° C. to about 1,000° C. for about 40 minutes to parts of a second. Heating copper to the point of red heat is undesirable because the film of copper oxide at temperatures substantially above 1,000° C. tends to become very thick and has a tendency to flake off, leaving surfaces without an oxide coating which would be unacceptable in the lithium treating operation.

Oxidation of the open internal and external surface areas of the metal substrates can be accomplished in any convenient manner; however, it can be accomplished effectively and efficiently with the use of a suitable furnace in which the metal substrates simply are heated to the required temperature, for the necessary time, in an atmosphere of air. Oxidation of the metal substrate surfaces can be determined visually and treatment stopped when the substrate is of the proper color indicating that oxidation has occurred.

As a result of this treatment, the oxidized metal substrate has a surface film of metal oxide not only on the outside surface portions thereof, but also throughout all open internal surfaces areas and voids connected with the outer surfaces areas of the foraminous metal substrate. The oxidized metal substrate is then cooled and is then ready for filling with lithium.

The oxidized metal substrate is filled with lithium by immersing the substrate in a molten lithium bath. The molten lithium bath may be molten elemental lithium, or molten lithium-based alloys having a melting point not over 600° C. in which lithium predominates, molten elemental lithium being preferred. Typical lithium-based alloys which may be used are those of aluminum and magnesium containing at least 50 percent, by weight, of lithium, the balance being aluminum or magnesium. For sake of convenience herein, reference is made simply to lithium and such reference will be understood to include lithium-based alloys unless otherwise indicated.

The molten lithium bath is prepared by melting lithium in any suitable container, preferably an iron container, and maintaining the bath at a temperature above the melting point of the lithium, which in the case of lithium metal itself is approximately 180° C. As is generally the case with lithium metal, it is preferred to prepare the molten lithium under an atmosphere free of carbon dioxide, water vapor, oxygen or nitrogen, such as that provided by an atmosphere of helium or argon, etc., argon being preferred.

The oxidized metal substrate is then immersed in the molten lithium bath and lithium fills the open internal and external surfaces areas of the foraminous substrate. When immersing the oxidized metal substrates in lithium, it is preferred that the molten lithium bath be maintained at a temperature of about 200° C. However, it is preferred that the molten lithium bath be maintained at a temperature of about 300° C. when oxidized copper substrates are immersed in molten lithium. After immersion in the molten lithium bath, the substrate is removed from the bath and cooled after which it is ready for use. Again, it is preferred that the oxidized metal substrate be immersed in the molten lithium bath under an atmosphere free of carbon dioxide, water vapor, oxygen or nitrogen, such as that provided by an atmosphere of helium, argon and etc., argon being preferred.

It is theorized that a reaction occurs between the molten lithium and the surface metal oxide film which enables the lithium to wet and permeate the open internal and external surface areas of the metal substrate. While not required for successful filling of the metal substrate with lithium, it is preferred that the metal substrate be moved about in the molten bath to aid in removing the products of the reaction between lithium and the surface metal oxide, thus partially removing potential impurities from the filled metal substrate.

This process accomplishes a physical filling of the open internal and external surfaces areas in the metal substrate by wetting the open internal and external surfaces areas of the metal substrate and results in little, if any, incorporation of atomic lithium into the lattice of the solid metal substrate. This is demonstrated by the fact that immersion of a lithium-filled metal substrate prepared by this process in water results in removal of substantially all of the lithium from the metal substrate. It is generally found that the oxidized foraminous metal substrates can be substantially completely filled with lithium by this process, although the amount of lithium which can be filled in a given metal substrate depends on the foraminous nature of the substrate.

One particularly useful application of the lithium-filled metal substrates of this invention is as a lithium battery anode where the larger the ratio of lithium to substrate, the better the performance as an anode.

The following examples illustrate the general procedure outlined above in greater detail:

EXAMPLE 1

A porous nickel sheet 1 ¼×1 ¼×0.033 inches having a porosity of 77 percent is heated in air on a hot plate for 30 minutes at 370° C. to obtain a film of nickel oxide on the open internal and external surface areas of the sheet. The oxidized nickel sheet is cooled to room temperature, transferred to an argon filled dry box and then immersed in a bath of molten lithium at a temperature of 300° C. for 5 seconds. The nickel sheet is removed from the molten lithium and cooled. Ninety-six percent, by weight, of the porous volume is filled with lithium as calculated by volume and weight difference.

EXAMPLE 2

Expanded nickel sheets 1×1×0.015 inches having openings of approximately 0.23 inches in their largest dimension are oxidized in an electrically heated furnace in air for the temperatures and times shown in table I to obtain a coating of nickel oxide on the open internal and external surface areas of the sheets. The oxidized nickel sheets are cooled, transferred to an argon filled dry box ad immersed in a pool of molten lithium at a temperature of 200° C. for 5 seconds. The nickel sheets are removed from the molten lithium and are found to be filled with lithium.

TABLE I

| Temperature (°C.) | Time (Minutes) |
| --- | --- |
| 600° | 10 |
| 600° | 20 |
| 600° | 40 |
| 800° | 0.5 |
| 800° | 2 |
| 1000° | 0.2 |

EXAMPLE 3 1A 14-mesh nickel screen 1½×1½ inches made with nickel wire having a diameter of 0.015 inch is heated to approximately 1,350° C. in air over a bunsen burner for 3 to 5 seconds. The nickel screen is cooled, transferred to an argon-filled dry box, where it is dipped in molten lithium at 210° C., removed immediately from the molten lithium and cooled. The metal screen was filled with lithium, making it impossible to see through the screen.

EXAMPLE 4

A 14-mesh nickel screen 1½×1½ inch made with nickel wire having a diameter of approximately 0.015 inch is treated as in example 3 and dipped in molten lithium at 350° C. The metal screen was filled with lithium making it impossible to see through the screen.

Example 5

A piece of nickel felt 0.8×3.2×0.060 inch thick, taken from a sheet of random, nonwoven fine nickel fibers having an apparent density of 20 percent that of nickel (80 percent pores) and a pore size of 60 microns is treated by heating one-half 0.8"×1.6"×0.060" of the nickel felt over a bunsen burner flame (approximately 1,350° C.) for 6 to 8 seconds. The nickel felt is cooled, transferred to an argon-filled dry box and dipped into molten lithium at 210° C. and removed and cooled. The portion of the nickel felt which was heated over the bunsen burner was filled with lithium, whereas the balance of the strip did not fill with lithium.

Example 6

The procedure of example 5 is repeated dipping the strip of nickel felt in molten lithium at 350° C. The portion of the nickel felt subjected to the heat treatment is filled with lithium, whereas the balance of the strip is not filled with lithium.

EXAMPLE 7

Expanded copper sheets 1×1 ×0.015 inch having openings of approximately 0.23 inch in their largest dimension are oxidized in an electrically heated furnace in air for the temperatures and times shown in table II to obtain surface areas of the sheets. The oxidized copper sheets are cooled, transferred to an argon-filled dry box and immersed in a pool of molten lithium at a temperature of 350° C. for 5 seconds. The copper sheets are removed from the molten lithium and are found to be filled with lithium.

TABLE II

| Temperature (°C.) | Time (Minutes) |
| --- | --- |
| 400° | 10 |
| 400° | 20 |
| 400° | 40 |
| 500° | 1 |
| 600° | 0.5 |
| 800° | 0.25 |
| 1000° | 0.1 |

EXAMPLE 8

A 14-mesh copper screen 1½×1½ inch made with copper wire having a diameter of 0.20 inch is heated over a bunsen burner flame (approximately 1,350° C.) for about 1 second or less. Heating the copper screen over a bunsen burner flame causes the copper screen to be heated to about 700° C., and forms a film of copper oxide on the open internal and external surface areas of the copper screen. The copper screen is cooled, transferred to an argon-filled dry box and dipped in molten lithium at about 350° C., removed immediately and cooled. The metal screen was filled with lithium, making it impossible to see through the screen.

EXAMPLE 9

Expanded low-carbon steel sheets (A.I.S.I.—Type 1010) 1 ×1 ×0.010 inch, having openings of approximately 0.08 inch in their largest dimension, are oxidized in a furnace in air for the temperatures and times shown in table III to obtain a coating of iron oxide on the open internal and external surface areas of the sheets. The oxidized iron sheets are cooled, transferred into an argon-filled dry box immersed in a pool of molten lithium at a temperature of 200° C. for 5 seconds. The iron sheets are removed from the molten lithium and are found to be filled with lithium.

TABLE III

| Temperature (°C.) | Time (Minutes) |
| --- | --- |
| 600° | 10 |
| 600° | 20 |
| 600° | 40 |
| 800° | 2 |
| 800° | 0.5 |
| 1000° | 0.1 |

EXAMPLE 10

A 40-mesh iron screen 1½×1½ inch made with iron wire having a diameter of 0.015 inch is heated over a bunsen burner flame (approximately 1,350° C.) for 3 to 5 seconds. The nickel screen is cooled, transferred to an argon-filled dry box, dipped in molten lithium at 210° C., removed immediately and cooled. The metal screen was filled with lithium, making it impossible to see through the screen.

EXAMPLE 11

The procedure of example 10 is repeated using an identical iron screen sample except the screen is dipped in molten lithium at 350° C. The metal screen was filled with lithium, making it impossible to see through screen.

EXAMPLE 12

Expanded stainless steel sheets (A.I.S.I.—Type 30) 1×1 ×0.015 inch, having openings approximately 0.23 inch in their largest dimensions, are oxidized in an electrically heated furnace in air from the temperatures and times shown in table IV to obtain a coating of oxide on the open internal and external surface areas of the sheets. The oxidized stainless steel sheets are cooled, transferred to an argon-filled dry box and immersed in a pool of molten lithium at a temperature of 200° C. for 5 seconds. The stainless steel sheets are removed from the molten lithium and are found to be filled with lithium.

TABLE IV

| Temperature (°C.) | Time (Minutes) |
| --- | --- |
| 600° | 40 |
| 800° | 5 |
| 800° | 1 |
| 1000° | 0.3 |
| 1000° | 0.1 |

EXAMPLE 13

A sample of expanded nickel metal 1×1.6 inch having openings approximately 0.12 inch in their largest dimension is heated over largest bunsen burner at approximately 1,350° C. for 1 second. The expanded metal is cooled, transferred to an argon-filled dry box and dipped in a bath of a molten lithium-aluminum alloy containing 15 percent by weight, aluminum heated to 300° C., removed immediately and cooled. 96percent, by weight, of the expanded sheet is filled with lithium as calculated by volume ad weight difference.

EXAMPLE 14

Example 13 is repeated using a bath of a molten lithium-magnesium alloy containing 15 percent, by weight, magnesium. The expanded metal is 90–95 percent filled with lithium as calculated by volume and weight difference.

EXAMPLE 15

An expanded monel metal sheet 1×1×0.015 inch, having an opening of approximately 0.23 inch in its largest dimension, is heated over a bunsen burner at approximately 1,350° C. for 2 seconds to obtain a film of metal oxide on the open internal and external surface areas of the sheet. The oxidized monel sheet is cooled, transferred to an argon-filled dry box, and immersed in a pool of molten lithium at a temperature of 200° C. for 5 seconds. The monel sheet is removed from the molten lithium and is found to be filled with lithium.

EXAMPLE 16

A 35-mesh brass screen 1×1×0.29 inch is heated over a bunsen burner for 1 second or less. Heating the brass screen over a bunsen burner for 1 second or less causes the brass screen to be heated to about 700° C. and forms an oxide film on the open internal and external surface areas of the brass screen. The brass screen is cooled, transferred to an argon-filled dry box, and immersed in a pool of molten lithium at a temperature of 200° C. for 5 seconds. The brass screen is removed from the molten lithium and is found to be filled wit lithium.

EXAMPLE 17

An expanded nickel sheet 1×1×0.015 inch having openings of approximately 0.23 inch which in its largest dimension is heated in an oxygen-filled bomb for 20 minutes at 600° C. to obtain a coating of nickel oxide on the open internal and external surface areas of the sheet. The oxidized nickel sheet is cooled, transferred to an argon-filled dry box and immersed in a pool of molten lithium at a temperature of 200° C. for 5 seconds. The nickel sheet is removed from the molten lithium and is found to be filled with lithium.

What is claimed is:

1. The method for preparing a lithium-filled foraminous metal substrate which comprises oxidizing the foraminous metal substrate to form a surface film of metal oxide substantially throughout the open internal and external surface areas of the foraminous substrate, and immersing the oxidized metal substrate in a molten lithium bath to fill the foraminous substrate with lithium.

2. The method of claim 1 wherein the foraminous metal substrate is selected from the group consisting of nickel, iron, copper, and nickel, iron and copper-based alloys in which the nickel, iron copper are the principal components.

3. The method of claim 2 wherein the foraminous metal substrate is low-carbon steel.

4. The method of claim 1 wherein the metal substrate is oxidized at a temperature of at least 300° C.

5. The method of claim 1 wherein oxidation occurs at a temperature of from about300° C. to 1,500° C.

6. The method of claim 1 wherein the metal substrate is oxidized to red heat.

7. The method of claim 2 wherein the metal substrate is selected from the group consisting of nickel, iron and nickel and iron alloys in which nickel and iron are the principal components wherein oxidation occurs at temperatures ranging from about 350° C. to about 1,350° C. for 60 minutes to a few seconds, respectively.

8. The method of claim 3 wherein oxidation occurs at temperatures ranging from about600° C. to about 1,000° C. for about 40 minutes to a few seconds, respectively.

9. The method of claim 2 wherein the metal substrate is selected from the group consisting of copper and copper-based alloys in which copper is the principal component wherein oxidation occurs at temperatures ranging from about 400° C. to about t1,000° C. for about 40 minutes to parts of a second, respectively.

10. The method of claim 1 wherein the molten lithium bath is selected from the group consisting of elemental lithium and lithium-based alloys of aluminum and magnesium.

11. The method of claim 1 wherein the molten lithium bath is elemental lithium maintained at a temperature of above about 180° C.

* * * * *

UNITED STATES PATENT OFFICE
CERTIFICATE OF CORRECTION

Patent No. 3,634,144         Dated January 11, 1972

Inventor(s) Barry Douglas Hanawalt

It is certified that error appears in the above-identified patent and that said Letters Patent are hereby corrected as shown below:

| | | |
|---|---|---|
| Col. 1, line 34, | "used" should be | --fused-- |
| Col. 4, line 75, | "ad" should be | --and-- |
| Col. 5, line 13, | "o'5" should be | --0.5-- |
| Col. 5, line 17, | omit "1" after "3" | |
| Col. 5, lines 57-58, | insert --a coating of copper oxide on the open internal and external-- after "obtain" | |
| Col. 6, line 22, | after "box" insert --and-- | |
| Col. 6, line 55, | "Type 30" should be --Type 304-- | |
| Col. 6, line 58, | "from" should be --for-- | |
| Col. 7, line 3 | "largest" should be --a-- | |
| Col. 7, line 45, | delete "which" | |
| Claim 2, line 4, | insert --and-- after "iron" | |
| Claim 5, line 2, | insert --about-- after "to" | |
| Claim 9, line 5, | delete --t-- after "about" | |

Signed and sealed this 8th day of August 1972.

(SEAL)
Attest:

EDWARD M. FLETCHER, JR.          ROBERT GOTTSCHALK
Attesting Officer                Commissioner of Patents